United States Patent
Kaye, Jr. et al.

(10) Patent No.: US 9,511,428 B2
(45) Date of Patent: Dec. 6, 2016

(54) BEVEL LOCK ASSEMBLY FOR MITER SAWS

(71) Applicant: Black & Decker Inc., Newark, DE (US)

(72) Inventors: Thomas R. Kaye, Jr., Fallston, MD (US); Craig A. Oktavec, Forest Hill, MD (US); Daryl S. Meredith, York, PA (US); Stephanie L. Vogel, York, PA (US); Lee M. Brendel, Bel Air, MD (US); Brian P. Wattenbach, Menomonee Falls, WI (US)

(73) Assignee: Black & Decker Inc., New Britian, CT (US)

( * ) Notice: Subject to any disclaimer, the term of this patent is extended or adjusted under 35 U.S.C. 154(b) by 0 days.

(21) Appl. No.: 14/594,364

(22) Filed: Jan. 12, 2015

(65) Prior Publication Data

US 2015/0183035 A1    Jul. 2, 2015

Related U.S. Application Data

(60) Continuation of application No. 12/419,350, filed on Apr. 7, 2009, now Pat. No. 8,960,063, which is a division of application No. 11/406,125, filed on Apr. 18, 2006, now abandoned.

(60) Provisional application No. 60/676,037, filed on Apr. 29, 2005.

(51) Int. Cl.
*B23D 45/04* (2006.01)
*B23D 45/14* (2006.01)
*B27B 5/29* (2006.01)
*B27B 27/06* (2006.01)

(52) U.S. Cl.
CPC ........... *B23D 45/042* (2013.01); *B23D 45/044* (2013.01); *B23D 45/048* (2013.01); *B23D 45/14* (2013.01); *B27B 5/29* (2013.01); *Y10T 83/7697* (2015.04); *Y10T 83/7788* (2015.04); *Y10T 83/8773* (2015.04)

(58) Field of Classification Search
CPC ....... B23D 45/04; B23D 45/14; B23D 45/044; B23D 45/048; B27B 5/29; Y10T 83/8773; Y10T 83/7697; Y10T 83/7788
USPC .................... 83/471, 471.2, 471.3, 473, 477, 477.1, 83/485, 490, 581, 699.51, 811; 30/375, 377

See application file for complete search history.

(56) References Cited

U.S. PATENT DOCUMENTS

| | | | |
|---|---|---|---|
| 6,016,732 A * | 1/2000 | Brault et al. ................. | 83/471.3 |
| 2004/0089125 A1* | 5/2004 | Schoene et al. ............. | 83/471.3 |
| 2004/0112190 A1* | 6/2004 | Hollis ....................... | B27B 5/29 83/13 |
| 2005/0211038 A1* | 9/2005 | Imamura ................... | B27B 5/29 83/473 |

* cited by examiner

*Primary Examiner* — Ghassem Alie
(74) *Attorney, Agent, or Firm* — Adan Ayala

(57) ABSTRACT

The miter saw has a base assembly, a rotatable table rotatably disposed on the base assembly, a saw assembly rotatably supported by the table, and a bevel lock assembly for locking the rotational position of the saw assembly relative to the table.

9 Claims, 6 Drawing Sheets

BEVEL LOCK ASSEMBLY FOR MITER SAWS

CROSS-REFERENCE TO RELATED APPLICATIONS

This application is a continuation of U.S. application Ser. No. 12/419,350, filed on Apr. 7, 2009, now pending, which is a continuation of U.S. application Ser. No. 11/406,125, filed on Apr. 18, 2006, which in turn derives priority from U.S. Application No. 60/676,037, filed Apr. 29, 2005.

FIELD OF THE INVENTION

This invention relates generally to a bevel lock assembly for a miter saw and more specifically to a bevel lock assembly for a compound slide miter saw.

BACKGROUND OF THE INVENTION

Typical miter saws have a base assembly, a table that is rotatable relative to the base assembly, and a saw assembly including a motor and a blade driven by the motor. The saw assembly may be pivotally attached to the table in order to allow for inclined cuts relative to the top surface of the table.

It is an object of the invention to provide a bevel lock assembly for such miter saws.

SUMMARY OF THE INVENTION

In accordance with the present invention, an improved miter saw is employed. The miter saw has a base assembly, a rotatable table rotatably disposed on the base assembly, a saw assembly rotatably supported by the table, and a bevel lock assembly for locking the rotational position of the saw assembly relative to the table.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which:

FIG. 3A is a partial cross-sectional side view and FIG. 3B is a partial cross-sectional view along line of FIG. 3A;

FIGS. 8A-8B are a partial front view and a cross-sectional view along line VIII-VIII of FIG. 8A, respectively; FIGS. 9A-9B are a partial front view and a cross-sectional view along line IX-IX of FIG. 9A, respectively.

DETAILED DESCRIPTION

Figure 1:
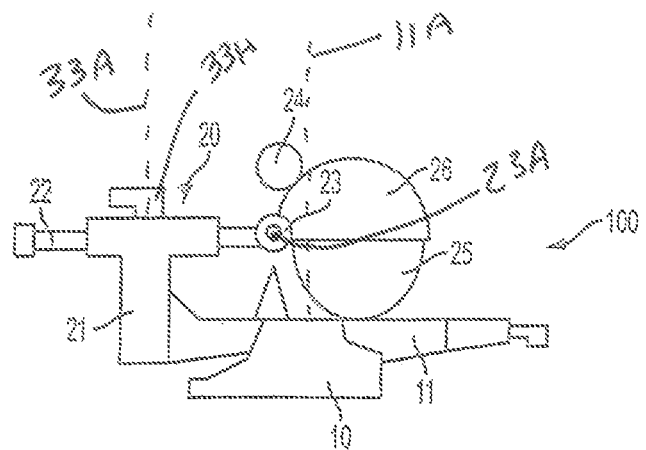
FIG. 1 is a side view of the miter saw according to the invention.

The invention is now described with reference to the accompanying figures, wherein like numerals designate like parts. Referring to FIG. 1, a miter saw 100 may include a base assembly 10, a rotatable table assembly 11 supported by base assembly 10, and a saw assembly 20 supported by the table assembly 11. Table assembly 11 rotates about a vertical axis 11A. Saw assembly 20 may include a support housing 21 rotatably connected to the table assembly 11, at least one rail 22 slidably connected to the support housing 21, a pivotable arm 23 pivotably attached to trunnion 21, a motor 24 supported by the arm 23 and driving a blade 25. Pivotable arm 23 rotates about a horizontal axis 23A. Arm 23 may also support an upper blade guard 26, which preferably covers an upper part of blade 25. A lower blade guard (not shown) may be pivotally attached to upper blade guard 26 to cover a lower part of blade 25.

Persons skilled in the art will recognize that miter saw 100 as shown is a slide miter saw. However, miter saw 100 may be a non-sliding miter saw by changing the elements in saw assembly 20, as is well known in the art.

Figure 2:
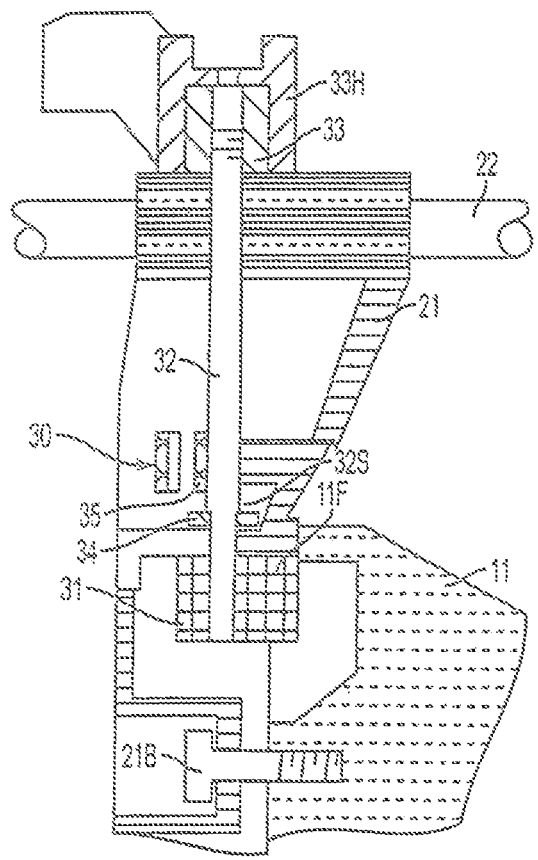
FIG. 2 is a partial cross-sectional side view of a first embodiment of a bevel lock assembly according to the invention.

Referring to FIG. 2, support housing 21 may be held in place against table assembly 11 via a bolt 21B. Support housing 21 preferably carries bevel lock assembly 30. Bevel lock assembly 30 preferably includes a body 31 contacting a flange 11F of table 11. A rod 32 may be threadingly engaged to body 31. Rod 32 preferably extends through support housing 21 until it exits through the top of support housing 21. A handle 33H may be attached to rod 32. Handle 33H rotates about a vertical axis 33A (shown in FIG. 1).

Alternatively, rod 32 may be captured at one end by body 31, and threadingly engaged to a nut 33, which is attached to handle 33H. Persons skilled in the art will recognize that nut 33 can be a hex adapter to allow repositioning in the event of wear. Accordingly, by rotating handle 33H, body 31 is moved upwardly into locking contact with flange 11F.

In order to maintain the proper alignment of rod 32, it may be preferably to provide a clamp 35 that pushes rod 32 into sliding contact with support housing 21.

Rod 32 may extend through a washer 34 disposed on a rib of support housing 21. Rod 32 may have a shoulder 32S contacting washer 34 in order to distribute the clamping force unto support housing 21.

Figure 3A:
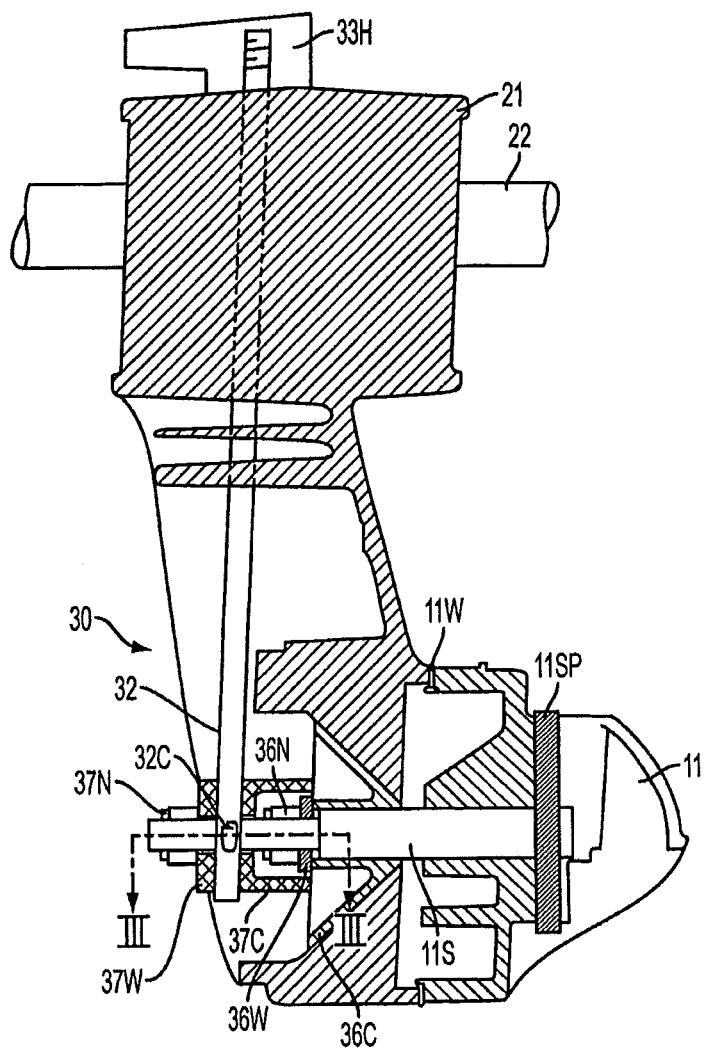
FIGS. 3A-3B illustrate a second embodiment of a bevel lock assembly according to the invention, where
Figure 3B:
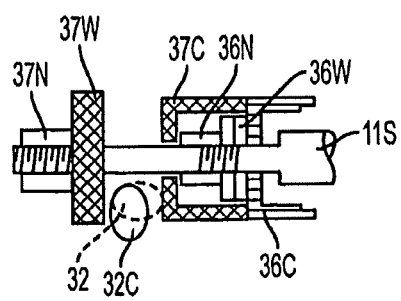

FIGS. 3A-3B illustrate a second embodiment of bevel lock assembly 30, where like numerals refer to like parts. The teachings of the previous embodiment are hereby incorporated by reference.

In this embodiment, a shaft 11S may be fixedly attached to table 11 via a pin 11SP. Shaft 11S extends through support housing 21. Support housing 21 preferably receives a cone 36C. Cone 36C is preferably made of powdered metal.

Washer(s) 36W may be disposed on shaft 11S against cone 36C. A nut 36N may threadingly engage shaft 11S, sandwiching washer(s) 36W between nut 36N and cone 36C. Persons skilled in the art will recognize that nut 36N will preferably prevent support housing 21 to separate from table 11.

A cupped washer 37C may also be disposed on shaft 11S and around nut 36N, contacting cone 36C. Rod 32 may be disposed adjacent and/or against washer 37C. A washer 37W is preferably disposed on shaft 11S, sandwiching rod 32 between washers 37C, 37W. A nut 37N is preferably threadingly engaged to shaft 11S, maintaining washer 37C on shaft 11S.

With such arrangement, a user can rotate handle 33H, causing a cam 32C to contact washer 37, pushing cone 36C (and thus support housing 21) into locking contact with table 11. Persons skilled in the art will recognize that such arrangement preferably removes all play between support housing 21 and table 11.

Preferably a washer 11W is disposed between table 11 and support housing 21. Washer 11W is preferably made of brass so that table 11 and support 21 (both of which may be made of aluminum) do not contact directly, thus preventing a lock up. Such washer 11W may also reduce the need for grease, so as to improve the locking function.

Figure 4:
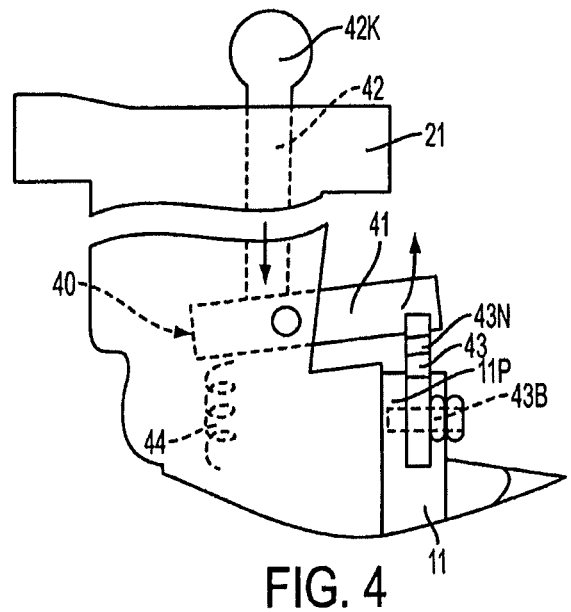
FIG. 4 is a side view of a first embodiment of a bevel stop assembly according to the invention.
Figure 5:
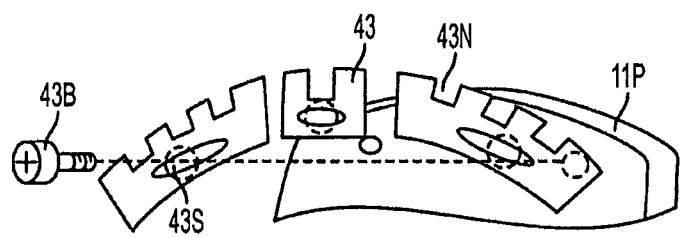
FIG. 5 is a partial exploded view of the first embodiment of the bevel stop assembly.

Referring to FIGS. 4-5, it is preferable to provide miter saw 100 with a bevel stop mechanism 40. Bevel stop mechanism 40 preferably includes a member 41 which may be pivotably attached to support housing 21. Member 41 may engage notches 43N disposed on at least one plate 43 (and preferably three plates 43) at predetermined angular bevel positions.

Plate(s) 43 may be attached to a flange 11P of table 11 via bolt(s) 43B threadingly engaging flange 11P. Plate(s) 43 may have slot(s) 43S allowing for adjustment of plate(s) 43 prior to tightening of bolt(s) 43B. Such adjustability allows the user to fine tune the predetermined bevel positions.

Persons skilled in the art will recognize that it is preferable to have multiple adjustable plates 43 so that different bevel angles may be adjusted separately. For example, the plate 43 containing the zero degree angle notch 43N can be adjusted separately without affecting the plate containing the 45 degree angle notch 43N so long as each angle notch is disposed on a different plate 43.

Rod 42 may be connected to member 41. Rod 42 may have a knob 42K. With such arrangement, the user may push down on knob 42K, moving rod 42 downwardly, causing member 41 to move from a first position engaging notch 43N into a second position bypassing notch 43N. The user can then change the angular bevel position of support housing 21 (and thus of saw assembly 20).

A spring 44 may be disposed in support housing 21 to bias member 41 towards the first position.

Persons skilled in the art will recognize that rod 42 may be integrally formed with member 41. In such case, member 41 need not be pivotally attached to support housing 21, allowing the user to jointly move rod 42 and member 41 between the first and second positions.

Figure 6:
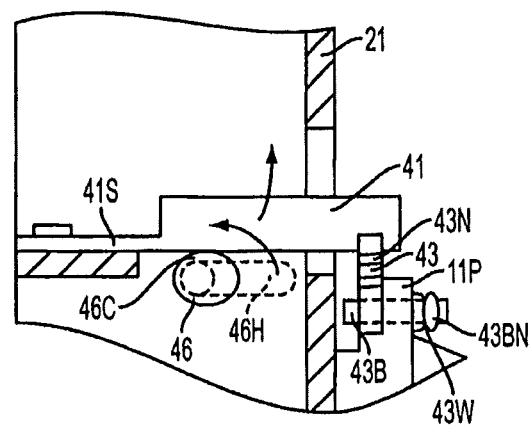
FIG. 6 is a partial cross-sectional side view of the second embodiment of a bevel stop assembly according to the invention.
Figure 7:
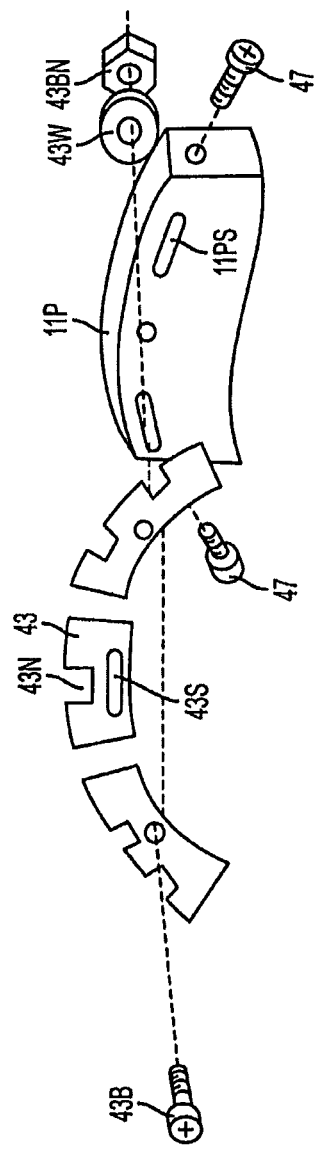
FIG. 7 is a partial exploded view of the second embodiment of the bevel stop assembly.

FIGS. 6-7 illustrate a second embodiment of bevel stop assembly 40, where like numerals refer to like parts. The teachings of the previous embodiment are hereby incorporated by reference.

There are three main differences between the first and second embodiments. First, member 41 may be disposed on a spring plate 41S which is preferably bolted or affixed to support housing 21. Spring plate 41S preferably biases member 41 towards the first position engaging notch 43N.

Second, cam assembly 46 may be used to move member 41 between the first and second positions, rather than rod 42. Cam assembly 46 may have a cam 46C disposed underneath member 41. Cam 46C may be connected to a handle 46H disposed outside of support housing 21. Accordingly, a user would preferably rotate handle 46H, causing cam 46C to rotate, lifting member 41 out of engagement with notch 43N. Persons skilled in the art will recognize that cam 46C is preferably connected to two handles 46H, each handle disposed on each side of support housing 21.

Third, like in the previous embodiment, at least one plate 43 may have a slot 43S to provide for adjustability of the notch(es) 43N. Some plate(s) 43 may have instead a hole, while flange 11P may have a slot 11PS. As shown in FIG. 7, bolt 43B may be inserted through plate 43, through slot 11PS (and thus through flange 11P), through a washer 43N and threadingly engage nut 43BN. Persons skilled in the art will recognize that such plate 43 can be adjusted by moving bolt 43B along slot 11PS. Such adjustment may be made by rotating screw 47, which preferably threadingly engages flange 11P and contacts bolt 43B, pushing bolt 43B along slot 11PS.

Figure 8A:
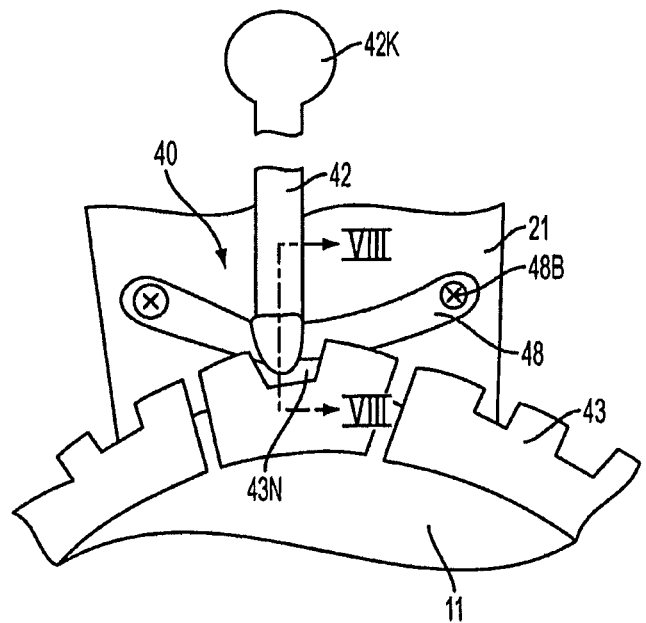
FIGS. 8A-8B illustrate a third embodiment of a bevel stop assembly according to the invention, where
Figure 8B:
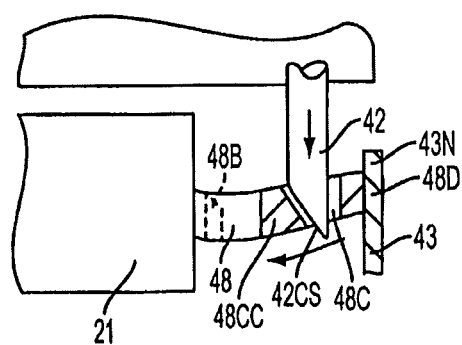

FIGS. 8A-8B illustrate a third embodiment of bevel stop assembly 40, where like numerals refer to like parts. The teachings of the previous embodiments are hereby incorporated by reference.

The main difference between the previous embodiments is that a member 48 has a detent 48D engaging detent notch 43N. Member 48 is preferably affixed to support housing 21 via bolts 48B. Detent 48D preferably snuggly engages detent notch 43N.

Member 48 may have a channel 48C which receives rod 42 therethrough. Member 48 may have a cam portion 48CC which contacts a cam surface 42CS on rod 42. With such arrangement, the user can move knob 42K (and thus rod 42) downwardly. As cam surface 42CS contacts portion 48CC, portion 48CC (and thus detent 48D) moves towards support housing 21, thus disengaging detent notch 43N.

Persons skilled in the art will recognize that it is desirable that portions of member 48 be made of a resilient material, such as spring steel, in order to bias detent 48D towards the first position, i.e., engaging detent notch 43N.

Figure 9A:
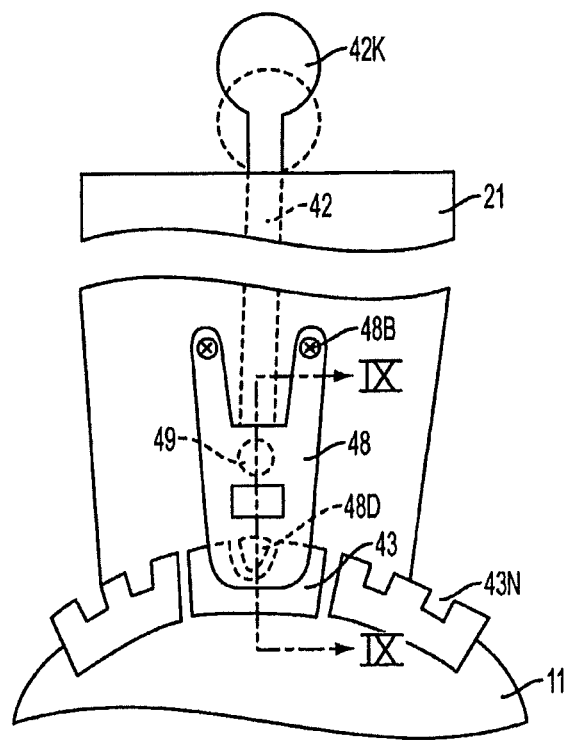
FIGS. 9A-9B illustrate a fourth embodiment of a bevel stop assembly according to the invention, where
Figure 9B:
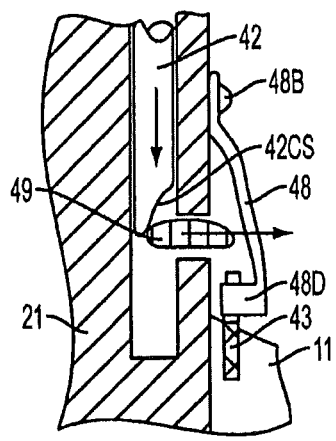

FIGS. 9A-9B illustrate a fourth embodiment of bevel stop assembly 40, where like numerals refer to like parts. The teachings of the previous embodiments are hereby incorporated by reference.

The main difference between the previous embodiments is that detent 48D engaging detent notch 43N from the front. A link 49 can be moved towards member 48 when the user moves knob 42K (and thus rod 42) downwardly. As cam surface 42CS contacts link 49, link 49 contacts member 48 and moves member 48 (and thus detent 48D) moves away from support housing 21, thus disengaging detent notch 43N.

Persons skilled in the art may recognize other additions or alternatives to the means disclosed herein. However, all these additions and/or alterations are considered to be equivalents of the present invention.

What is claimed is:
1. A miter saw comprising:
a base assembly;
a rotatable table rotatably disposed on the base assembly, the rotatable table rotating about a first vertical axis;
a saw assembly rotatably supported by the table, the saw assembly comprising a support housing rotatably connected to the table, a pivotable arm supported by the support housing, the pivotable arm rotating about a first horizontal axis, a motor supported by the arm and a blade driven by the motor; and
a bevel lock assembly for locking the rotational position of the saw assembly relative to the table, the bevel lock assembly comprising a handle disposed on top of the support housing, the handle rotating about a second vertical axis, and a rod attached to the handle, the rod having a rotatable cam surface being movable by the handle between a first position locking the saw assem- bly relative to the table, and a second position not locking the saw assembly relative to the table.

2. The miter saw of claim 1, wherein the rod is threadingly engaged to a body.

3. The miter saw of claim 2, wherein the body contacts the table when the rod is in the first position and the body does not contact the table when the rod is in the second position.

4. The miter saw of claim 1, wherein the cam surface urges the support housing towards the table when the rod is in the first position and the cam surface does not urge the support housing towards the table when the rod is in the second position.

5. The miter saw of claim 4, wherein the support housing is rotatably disposed on a shaft fixedly attached to the table.

6. The miter saw of claim 5, wherein a conical portion contacts the support housing.

7. The miter saw of claim 6, wherein a first nut threadingly engages the shaft.

8. The miter saw of claim 7, wherein a cupped washer is disposed on the shaft and around the first nut, the cupped washer contacting the conical portion.

9. The miter saw of claim 8, wherein a second nut threadingly engages the shaft, the cam surface being disposed between the cupped washer and the second nut.

* * * * *